2,844,549

METHOD FOR THE INCORPORATION OF LIGNIN INTO SYNTHETIC RUBBER

Raoul L. Provost, West Cheshire, Conn., assignor to United States Rubber Company, New York, N. Y., a corporation of New Jersey No Drawing. Application July 28, 1954
Serial No. 446,397

6 Claims. (Cl. 260—17.5)

This invention relates to the incorporation of lignin into synthetic rubber, and more particularly to mixed coagula from synthetic rubber latex and aqueous alkali solution of lignin.

Lignin is commonly recovered by precipitation from its soluble sodium salt in the black liquor in the kraft sulfate process of wood pulping by acidification of the waste liquor. Lignin is readily soluble in aqueous alkali, e. g. alkali metal hydroxide or ammonium hydroxide solution, to form alkali lignate solution. It has been known for some time that lignin is an excellent reinforcing agent for synthetic rubber provided that the lignin is added as an aqueous alkali solution to the synthetic rubber latex and the mixture co-precipitated. See Keilen and Pollak, Ind. Eng. Chem. 39, 480–483 (April 1947) and Pollak U. S. Patent 2,608,537. However, when effective reinforcing amounts of lignin are co-precipitated with the synthetic rubber, e. g. 25 to 75 parts of lignin per 100 parts of synthetic rubber, recovery of the co-precipitate is very difficult because it comes down in such a finely divided condition that it is impractical to filter it, as is done with the coagulant crumbs in straight synthetic rubber latex coagulation. See Keilen et al., India Rubber World, 124, 178–181 (May 1951). To date, lignin is still not being used as a reinforcing agent for synthetic rubber commercially.

The present invention provides a method of preparing readily filterable coagulum particles of a mix containing lignin and synthetic rubber in amounts from 25 to 75 parts of lignin per 100 parts of rubber, from synthetic rubber latex and aqueous alkali solution of the lignin.

In carrying out the present invention, there is first co-precipitated with conventional acid, a mixture of an amount of synthetic rubber latex containing 25% to 75% of the synthetic rubber component of the final coagulum particles and an amount of aqueous alkali solution of lignin containing substantially all the lignin component of the final coagulum particles. The remaining 75% to 25% of the synthetic rubber in the form of synthetic rubber latex is then mixed with the first synthetic rubber-alignin co-precipitate without coagulation of the added synthetic rubber latex, and after the mixing, the added synthetic rubber latex is then coagulated with acid. The first co-precipitate is in the form of a sludge of very fine particles that cannot readily be separated from the aqueous medium by filtering. The last coagulation of the added synthetic rubber latex around the finely divided particles of the first synthetic rubber-lignin co-precipitate forms crumbs having a physical character somewhat like the straight synthetic rubber crumb coagulum particles and which are of large enough dimensions to permit efficient filtration and drying similar to the coagulum crumbs in conventional synthetic rubber latex coagulation. The amount of lignin will be 25 to 75 parts per 100 parts of synthetic rubber in the final synthetic-rubber lignin mix. The initially mixed latex and lignin solution may be co-precipitated by mixing with an aqueous solution of acid, such as formic, sulfuric, hydrochloric, phosphoric or acetic acid, which may, if desired, contain added salts. It is important that the final latex added to the first co-precipitate be not immediately coagulated by virtue of residual acid remaining from the co-precipitation, since it is desired to thoroughly mix the added latex with the first co-precipitate before the added latex is coagulated on the co-precipitate particles. There are various simple manners of accomplishing this result. The amount of acid coagulant used may be only enough to precipitate the mixture of synthetic rubber latex and aqueous alkali lignate, without having sufficient residual acid to coagulate the later added latex. It is preferable, however, to use an excess of acid for the first co-precipitation of synthetic rubber and lignin and then neutralize the excess and by addition of alkali to adjust the pH to 7 or higher before adding the remaining latex. If desired, the finely divided initial co-precipitate may be partly dewatered, as by decantation, and slurried in further water to reduce residual acid. Such co-precipitates will slowly settle and permit decantation, although they are not readily filterable. After the balance of the synthetic rubber latex is added to the first finely divided co-precipitate and mixed therewith, the added latex is coagulated by mixing with additional acid. The coagulation of the added synthetic rubber latex provides an envelope of synthetic rubber around the finely divided particles of the first synthetic rubber and lignin co-precipitate. The thus formed mixed coagulum crumbs are readily filterable. The final product after filtering and drying is a physical mixture comprising particles of a co-precipitate of synthetic rubber and lignin enveloped in substantially lignin-free in situ coagulated synthetic rubber. Working of this product in conventional rubber machinery, such as on a mill or in an internal mixer, renders the mixture homogeneous since the two phases are entirely compatible one with another. If desired, other compounding ingredients may be incorporated at any convenient point in the process, such as into the latex before initial mixing with the lignin solution, or into the initial mixture of the latex and lignin solution before or after co-precipitation, or into the latex which is added to the synthetic rubber-lignin co-precipitate, or any combination thereof. Such other compounding ingredients include carbon black, rubber processing oils and other extenders, zinc oxide, clays, chemical plasticizers, tackifiers, resins, and various vulcanizing ingredients normally used in the compounding of rubber products.

The concentration of the alkali aqueous solution of lignin is not critical, the lignin concentration generally being 5% to 25%. The concentration of the synthetic rubber latex is not critical, the synthetic rubber concentration generally being 15% to 35%. The synthetic rubber latex is an alkaline emulsion polymerizate of conventional synthetic rubber forming monomers polymerized at temperatures in the range —40° F. to 150° F. with conventional emulsifiers, catalysts, activators, regulators, as well known in the art.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperlene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group which are copolymerizable with butadienes-1,3, are aryl olefines, such as styrene, vinyl naphthylene; alpha methyl styrene, parachloro styrene, dichlorostyrene; the alpha methylene carboxylic acids and their esters, nitriles and amides, such as acrylic acid, methyl acrylate, methyl methacrylate, acrylonitrile, methacrylonitrile, methacrylamine; methyl vinyl ether, methyl vinyl ketone; vinylidene chloride. Such synthetic rubbers may generically be termed "butadienoid polymer synthetic rubbers."

The following is illustrative of the present invention. All parts and percentages used herein are by weight.

The GR–S synthetic rubber latex used was prepared by conventional polymerization at about 41° F. to about 60% conversion of an aqueous emulsion of 75 parts of butadiene and 25 parts of styrene containing potassium soap of disporportionated rosin acid emulsifier, organic peroxide catalyst, iron pyrophosphate activator, and mixed tertiary mercaptan regulator.

An aqueous solution of sodium lignate was prepared by dissolving 100 parts of commercial lignin in 400 parts of water and 8 parts of sodium hydroxide. An amount of the sodium lignate solution was thoroughly mixed with an amount of the synthetic rubber latex to give 30 parts of lignin (dry weight) per 100 parts of synthetic rubber (dry weight). This mixture of synthetic rubber latex and aqueous alkali lignin was then poured into a bath of 5% sulfuric acid with stirring to co-precipitate the synthetic rubber and lignin. The resulting co-precipitate was so fine that filtration could only be accomplished on a Buechner funnel with high vacuum, which method is wholly inapplicable to the present type of commercial operations.

In a second batch, an amount of the sodium lignate solution was added to synthetic rubber latex to result in a loading of 30 parts of lignin (dry weight) to 50 parts of the synthetic rubber (dry weight). This mixture also poured into a bath of 5% sulfuric acid with stirring and the same type of difficultly filterable fine co-precipitate was obtained as in the first batch. In this second batch, however, the slurry of co-precipitate which was slightly acid from excess sulfuric acid was neutralized with sodium hydroxide. There was then added to the neutralized slurry of co-precipitate an amount of latex equal to 50 parts of synthetic rubber (dry weight) which was the same amount as originally mixed with the alkali lignin solution. This gave an overall loading of 30 parts of lignin (dry weight) to 100 parts of the synthetic rubber (dry weight). The added synthetic rubber latex did not coagulate since the acid slurry of co-precipitate was neutralized. After mixing the latex with the slurry of co-precipitate, a .5% solution of sulfuric acid was added with mild agitation, whereupon the synthetic rubber in the added uncoagulated latex was coagulated so as to envelop the particles of synthetic rubber-lignin co-precipitate formed in the first precipitation step with a coating of lignin-free synthetic rubber. The resulting mixed coagulum came down in the form of irregularly shaped, porous, nonfriable crumbs which were easily filtered on a 40-mesh screen. After filtering and drying, the crumb was worked on a rubber mill for a few minutes to form a completely homogeneous batch.

In view of the many changes and modifications that may be made without departing from the principles underlying the invention, reference should be made to the appended claims for an understanding of the scope of the protection afforded the invention.

Having thus described my invention what I claim and desire to protect by Letters Patent is.

1. The method of preparing synthetic rubber in admixture with 25 to 75 parts of lignin per 100 parts of synthetic rubber which comprises mixing an amount of synthetic rubber latex containing 25% to 75% of said 100 parts of synthetic rubber with an aqueous alkali solution containing substantially all the 25 to 75 parts of lignin, co-precipitating the mixture, mixing synthetic rubber latex containing the remaining 75% to 25% of said 100 parts of synthetic rubber with the first synthetic rubber-lignin co-precipitate without coagulation of the added latex and after such mixing coagulating the added latex in the presence of said first co-precipitate, and filtering the thus formed mixed coagulum, said synthetic rubber latex being an aqueous emulsion polymerizate of material selected from the group consisting of butadienes-1,3 and mixtures of butadienes-1,3 with compounds containing a single $CH_2=C<$ group which are copolymerizable with butadienes-1,3.

2. The method of claim 1 in which the synthetic rubber is a butadiene-styrene copolymer.

3. The method of preparing synthetic rubber in admixture with 25 to 75 parts of lignin per 100 parts of synthetic rubber which comprises mixing an amount of synthetic rubber latex containing 25% to 75% to said 100 parts of synthetic rubber with an aqueous alkali solution containing substantially all the 25 to 75 parts of lignin, co-precipitating the mixture by addition of acid and then neutralizing any residual acidity, mixing synthetic rubber latex containing the remaining 75% to 25% of said 100 parts of synthetic rubber with the first synthetic rubber-lignin co-precipitate without coagulation of the added latex and after such mixing coagulating the added latex in the presence of said first co-precipitate by addition of acid, and filtering the thus formed mixed coagulum, said synthetic rubber latex being an aqueous emulsion polymerizate of material selected from the group consisting of butadienes-1,3 and mixtures of butadienes-1,3 with compounds containing a single $CH_2=C<$ group which are copolymerizable with butadienes-1,3.

4. The method of claim 3 in which the synthetic rubber is a butadiene-styrene copolymer.

5. The method of preparing synthetic rubber in admixture with 25 to 75 parts of lignin per 100 parts of synthetic rubber which comprises mixing an amount of synthetic rubber latex containing 25% to 75% of said 100 parts of synthetic rubber with an aqueous alkali solution containing substantially all the 25 to 75 parts of lignin, co-precipitating the mixture by addition of sulfuric acid and then neutralizing any residual acidity, mixing synthetic rubber latex containing the remaining 75% to 25% of said 100 parts of synthetic rubber with the first synthetic rubber-lignin co-precipitate without coagulation of the added latex and after such mixing coagulating the added latex in the presence of said first co-precipitate by addition of sulfuric acid, and filtering the thus formed mixed coagulum, said synthetic rubber latex being an aqueous emulsion polymerizate of material selected from the group consisting of butadienes-1,3 and mixtures of butadienes-1,3 with compounds containing a single $CH_2=C<$ group which are copolymerizable with butadienes-1,3.

6. The method of claim 5 in which the synthetic rubber is a butadiene-styrene copolymer.

References Cited in the file of this patent
UNITED STATES PATENTS

| | | |
|---|---|---|
| 2,608,537 | Pollak | Aug. 26, 1952 |
| 2,769,789 | Madge et al. | Nov. 6, 1956 |